US005397868A

United States Patent [19]

Smith et al.

[11] Patent Number: 5,397,868

[45] Date of Patent: Mar. 14, 1995

[54] TRANSFER SWITCH

[75] Inventors: George A. Smith, N. Huntingdon Township, Westmoreland County; Thomas K. Fogle, Pittsburgh; Mark L. Lotzmann, Irwin; Robert N. Krevokuch, West Newton, all of Pa.

[73] Assignee: Eaton Corporation, Cleveland, Ohio

[21] Appl. No.: 128,500

[22] Filed: Sep. 28, 1993

[51] Int. Cl.[6] .......................... H01H 3/34; H01H 9/26; H02J 9/00

[52] U.S. Cl. .......................... 200/18; 200/50 C; 307/64

[58] Field of Search .......................... 200/17 R, 17 A, 18, 200/50 C, 5 R-5 EB; 307/64

[56] References Cited

U.S. PATENT DOCUMENTS

| | | | |
|---|---|---|---|
| 3,236,967 | 2/1966 | Bottonari et al. | 335/69 |
| 3,778,633 | 12/1973 | De Visser et al. | 307/64 |
| 3,806,684 | 4/1974 | Hauser | 200/400 |
| 4,021,678 | 3/1977 | Moakler et al. | 307/64 |
| 4,157,461 | 6/1979 | Witkor | 200/18 |
| 4,270,031 | 5/1981 | Borona et al. | 200/50 C |
| 4,286,242 | 8/1981 | Mrenna et al. | 335/160 |
| 4,359,611 | 11/1982 | Haskins | 200/1 TK |
| 4,398,097 | 8/1983 | Schell et al. | 307/64 |
| 4,404,446 | 9/1983 | Maier et al. | 200/320 |
| 4,409,449 | 10/1983 | Takano et al. | 200/400 |
| 4,423,336 | 12/1983 | Iverson et al. | 307/64 |
| 4,510,357 | 4/1985 | Winterbottom | 200/50 R |
| 4,523,769 | 6/1985 | Glaser et al. | 280/252 |
| 4,575,592 | 3/1986 | Rose | 200/6 R |
| 4,587,390 | 5/1986 | Gray | 200/400 |
| 4,596,310 | 6/1986 | Hatakeyama et al. | 185/40 R |
| 4,742,200 | 5/1988 | Marquardt et al. | 200/325 |
| 4,760,278 | 7/1988 | Thomson | 307/64 |
| 4,827,089 | 5/1989 | Morris et al. | 200/50 C |
| 4,894,796 | 1/1990 | Engel et al. | 395/275 |
| 4,902,859 | 2/1990 | Witzmann et al. | 200/50 C |
| 4,924,041 | 5/1990 | Yee | 200/50 C |
| 4,999,598 | 3/1991 | Jannesari et al. | 335/122 |
| 5,081,367 | 1/1992 | Smith et al. | 307/64 |
| 5,274,206 | 12/1993 | Milianowicz | 200/400 |

*Primary Examiner*—J. R. Scott
*Attorney, Agent, or Firm*—Martin J. Moran

[57] ABSTRACT

A transfer switch mechanism is provided for operating the handles of a pair of circuit interrupters. The transfer switch mechanism has a lever arm movable between advanced and retracted positions, the lever arm having a gripping portion permitting handhold for manual operation. The lever arm turns an axle via a ratchet assembly with pawls that permit the axle to turn in one direction but oppose movement of the axle in the direction counter to that direction. The axle turns a crank, and a pair of connecting rods have proximal ends coupled to the crank. The transfer switch mechanism further includes a pair of handle-engaging heads, each of which has opposed abutment surfaces that removably receive the handle of one or the other circuit interrupters between the opposed abutment surfaces. A base is fixed relative to the circuit interrupters and movably supports the lever arm and the handle-engaging heads. The connecting rods have distal ends respectively coupled to one of the two heads such that operation of the lever arm between the advanced and retracted positions causes the abutment surfaces to drive against the handles and thereby move the handles between operative positions.

20 Claims, 6 Drawing Sheets

TRANSFER SWITCH

CROSS-REFERENCE TO RELATED APPLICATIONS

The subject matter of this application Ser. No. 08/127,919 is related to subject matter of a copending, concurrently-filed application entitled "HANDLE ACTUATOR FOR A CIRCUIT INTERRUPTER HANDLE", by inventors George A. Smith, Thomas K. Fogle, and Mark L. Lotzmann (attorney docket number 57,980) and previous copending application Ser. No. 874,861, now U.S. Pat. No. 5,274,206, filed Apr. 28, 1992, entitled "SPRING CHARGING MECHANISM FOR CIRCUIT BREAKERS AND TRANSFER SWITCHES", by inventor Stanislaw A. Milianowicz, the latter application being incorporated herein by this reference. Both of the above-mentioned applications are assigned to the assignee of the present application.

BACKGROUND OF THE INVENTION

1. Field of the Invention

The invention relates to the field of transfer switches, and in particular concerns a transfer switch mechanism for transferring a power-consuming load reversibly between a pair of electric circuits.

2. Prior Art

Transfer switches are known in the art. Transfer switches operate, for example, to transfer a power consuming load from a circuit with a normal power supply to a circuit with an auxiliary power supply. Applications for transfer switches include stand-by applications, among others, in which the auxiliary power supply stands-by if the normal power supply should fail.

A transfer switch typically comprises a pair of circuit interrupters combined with a drive input and a linkage system. The preferred types of circuit interrupters have been the molded-case switches and molded-case circuit breaker type because these types are commercially available in a wide array of sizes and are relatively economical compared to other options. The preferred type of drive input depends on the application for the transfer switch. Usually motors are preferred, but other times there is a clear preference for manually-operated mechanisms.

As for the linkage system, there is a great variety in the prior art, and in all their variety known linkage systems are relatively involved and complex. The linkage system extends from the drive input to the handle of the circuit interrupter. Its function is to couple the drive input with the handle of the circuit interrupter so that drive force from the drive input is translated into position changes between progressive positions in the handle. Examples are shown by the U.S. Pat. Nos. 5,081,367—Smith et al., 4,760,278—Thomson and 4,398,097—Schell et al.

While known transfer switches include motor or manually-operated linkage systems for operating circuit interrupter handles, known linkage systems are deficient for numerous reasons. They generally are deficient in providing adequate mechanical advantage. Large circuit interrupters, for example, may require a 150 to 300 pound force to operate the handle between the CLOSED and OPEN position. Such handles are very difficult for electricians to operate without some kind of mechanical advantage.

Known motor or manually-operated linkage systems typically have a handle-engaging joint between the distal end and the handle, but the known joints are not adequately stiff. The joints are prone to twisting between the handle and the joint as the handle requires relatively greater force for operation. Twisting is likely to cause inelastic parts to fail or elastic parts to deform.

Furthermore, known motor or manually-operated linkage systems fail to incorporate any mechanism for enabling the advance of the circuit interrupter handles in short increments, without losing forward progress.

Further still, known motor or manually-operated linkage systems involve relatively elaborate mounting structures to couple together with commercially standard molded-case circuit switches and/or molded-case circuit breakers. Indeed, the known motor or manually-operated linkage systems characteristically are relatively costly and complicated structures to manufacture. What is needed is an improvement which overcomes the deficiencies in the prior art.

SUMMARY OF THE INVENTION

It is an object of the invention to provide a transfer switch mechanism for gaining a mechanical advantage in the operation of a handle of a circuit interrupter.

It is another object of the invention to provide a transfer switch mechanism comprising a crank coupled to a handle of a circuit interrupter and a manually-pumped lever coupled to the crank for selectively operating the handle.

It is another object of the invention to provide a transfer switch mechanism comprising a crank coupled to a handle of a circuit interrupter and a ratchet assembly constraining the rotation of the crank to a single direction of rotation.

It is another object of the invention to provide a transfer switch mechanism for operating a handle of a commercially standard molded-case circuit switch or molded-case circuit breaker, wherein the transfer switch mechanism includes a planar base for clapping together with a planar surface of the switch or circuit breaker in a releasably fastened relationship.

It is another object of the invention to provide a transfer switch mechanism comprising a pair of spaced and opposed abutment surfaces for closely fitting opposite sides of a handle of a circuit interrupter, wherein the abutment surfaces drive against the handle to drive the handle between progressive positions.

It is another object of the invention to provide a transfer switch mechanism comprising a crank coupled to a drive input and a handle actuator for operating the handle of a switch or circuit breaker, wherein the crank and handle actuator are coupled in an arrangement that precludes twisting between the handle and the handle actuator.

It is another object of the invention to provide a transfer switch mechanism comprising a drivable crank and a driven handle actuator coupled to the crank in an arrangement that precludes twisting between the handle and the handle actuator, wherein the crank and handle actuator are coupled by a connecting rod that moves in a plane of symmetry through the handle.

It is another object of the invention to provide a transfer switch mechanism comprising a handle actuator for operating a pivotal handle and a connecting rod coupling the handle actuator with a drive input, wherein the connecting rod generally reciprocates linearly along a tangent of an arc about an axis that is coincident with a pivot axis defined by the pivotal handle.

It is another object of the invention to provide a transfer switch mechanism comprising a drivable handle actuator for operating a pivotal handle, wherein the lines of action (which are defined by the forces transmitted from the handle actuator to the handle) are coincident with tangents of an arc about a pivot axis defined by the pivotal handle.

It is another object of the invention to provide a transfer switch mechanism comprising a drivable pair of spaced and opposed abutment surfaces closely fitting opposite sides of a pivotal handle for driving against the handle to move the handle between progressive positions, wherein a substantially constant relative position is maintained between the handle and abutment surfaces while the handle is driven between progressive positions.

It is another object of the invention to provide a transfer switch mechanism for operating a handle of a circuit interrupter, wherein the transfer switch mechanism is inexpensive and easy to manufacture, yet strong and durable.

These and other objects are accomplished by a transfer switch mechanism according to the invention for operating the handle of a pair of circuit components like a circuit interrupters, molded-case circuit breakers, molded-case switches, and motor contactors. The transfer switch mechanism comprises a base fixed relative to the circuit interrupters. A lever arm is movably coupled to the base and is operable in a cyclical stroke between an advanced and a retracted position. The lever arm includes a gripping portion to permit a handhold for manual operation thereof. A pair of handle-engaging heads are movably coupled to the base. The base includes two sets of opposite flange portions, each set being positioned such that the opposite flange portions are disposed on opposite sides of the handle of one or the other circuit interrupters. The flanges each have an arcuate opening. The heads each comprise a pair of elongated pins spaced parallel apart. The pins have outer surface portions between opposite ends, and these outer surface portion define opposed abutment surfaces. The heads are positioned such that the handle of one or the other circuit interrupters is removably received between these abutment surfaces.

The lever arm turns an axle via a ratchet assembly that permits the axle to turn in one direction and opposes movement of the axle in the direction counter to said one direction. The axle turns a crank which likewise turns in a single direction only. A pair of connecting rods have proximal ends coupled to the crank and distal ends formed as a U-shaped yokes with opposite arms which respectively couple to the handle-engaging pins of one or the other heads. Thus, manual operation of the lever arm causes the crank to turn the proximal ends of the connecting rods in a circular path. The distal ends correspondingly drive the abutment surfaces against the handles to move the handle between the operative positions thereof.

The arcuate openings of the flange portions guide the abutment surfaces in an arcuate path such that the abutment surfaces are maintained in a substantially constant relative position on the handles as the handles move between the operative positions. Thus the abutment surfaces neither slide nor roll on the handles because there is no relative displacement therebetween. A particular arrangement involves pivoted handles. The arcuate openings guide the abutment surfaces in arcuate paths about an axis that is coincident with the pivot axis defined by the handle of the associated circuit interrupter.

The base is formed to clap together with the generally planar surfaces of the circuit components. These planar surfaces characteristically have a boss from which the handle protrudes. The base includes an opening for passing the boss therethrough until the base claps together with the generally planar surface. The base preferably has a planar mating surface.

Each connecting rod is arranged to advance and retract in a plane of symmetry through the handle of the associated circuit component. This plane of symmetry perpendicularly intersects the pivot axis defined by the pivoted handle. A symmetrically arranged connecting rod eliminates the problem of twist between the handle and the handle-engaging pins.

A number of additional features and objects will also become apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

Figure 1:
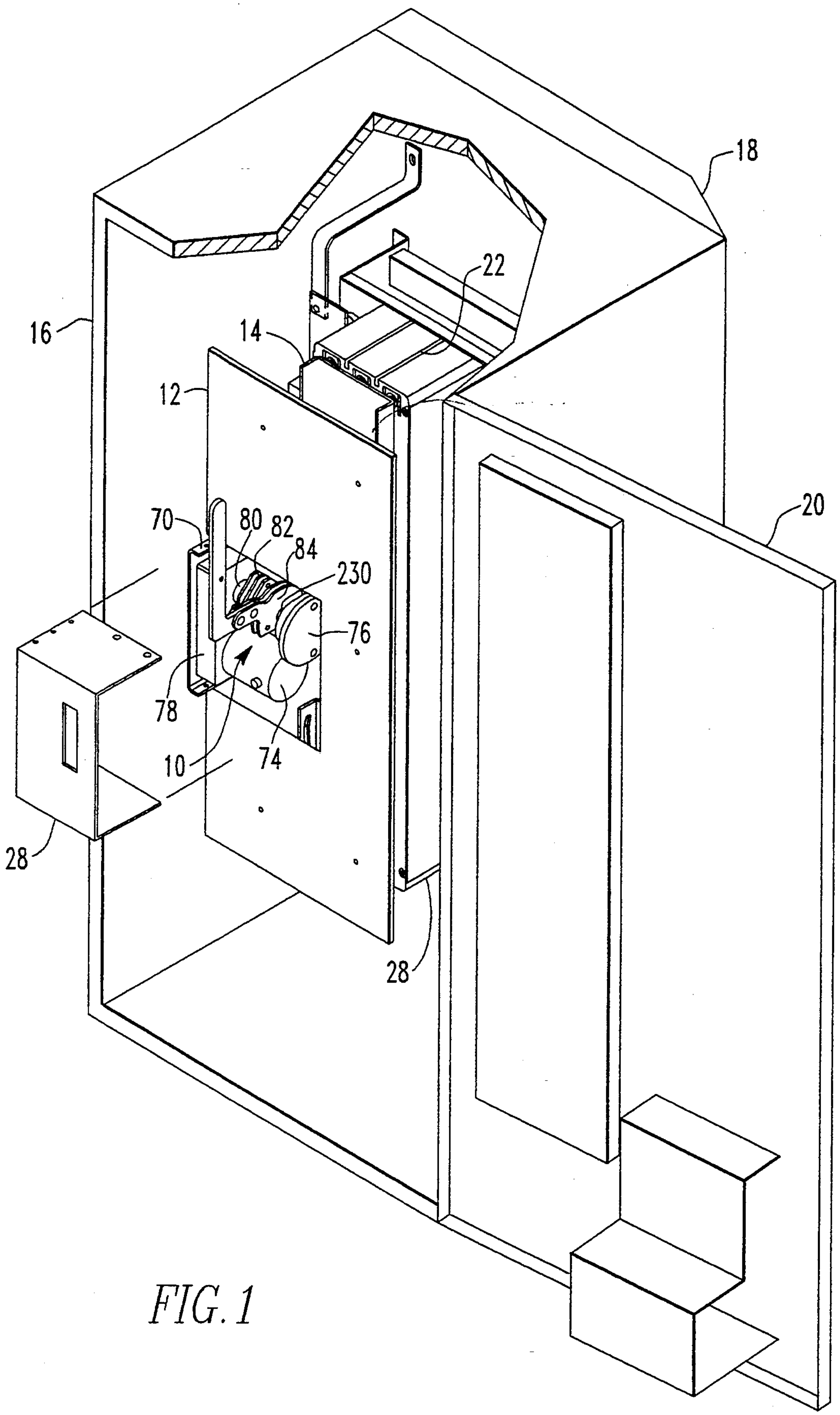
FIG. 1 is a perspective view of a typical transfer switch according to the invention, shown incorporated is a transfer switch power panel assembly that is mounted vertically in a cabinet (partly broken away), all which illustrate an operative environment for the typical transfer switch
Figure 7C:
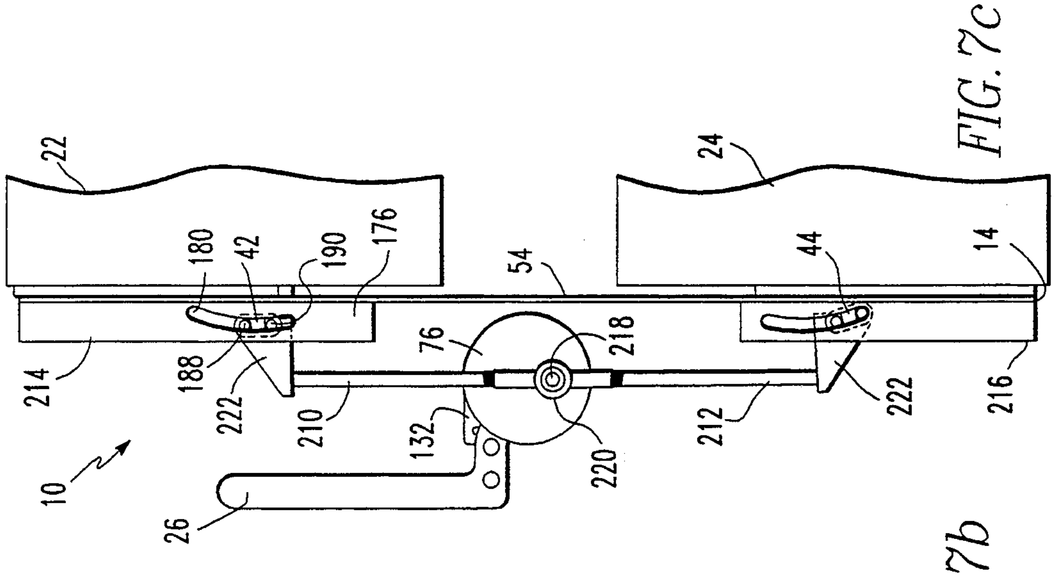
Figure 7B:
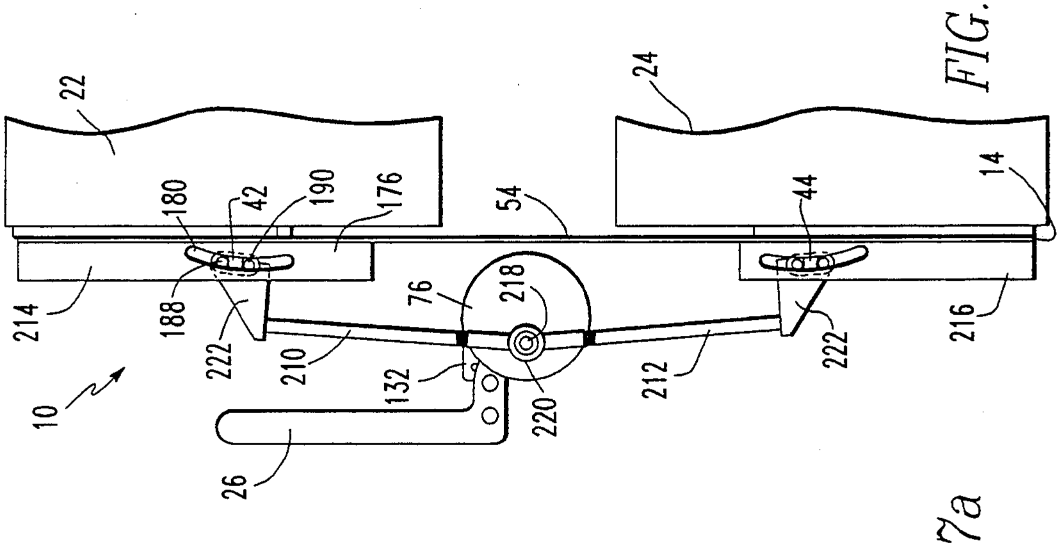
Figure 7A:
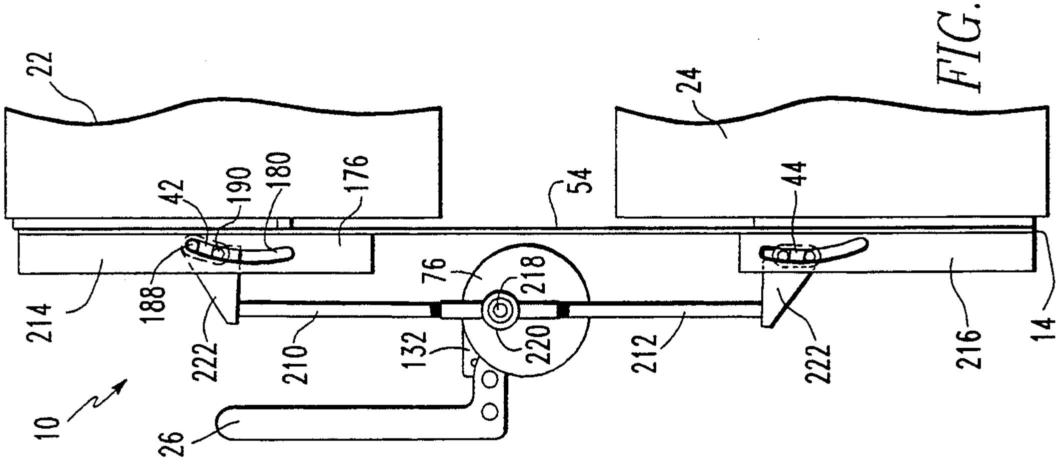

FIG. **7*a* is an enlarged scale elevation view of the right side of the transfer switch mechanism assembly of FIG. 1**;

FIG. **7*b* is a view similar to FIG. 7*a* except that the crank is rotated counterclockwise from a 12 o'clock position to a 9 o'clock position; and FIG. 7*c* is a view similar to FIG. 7*b*** except that the crank is rotated counterclockwise from the 9 o'clock position to a 6 o'clock position.

DETAILED DESCRIPTION OF THE PREFERRED EMBODIMENTS

In FIG. 1, a transfer switch mechanism 10 according to the invention is partly in view behind a cover plate 12. The transfer switch mechanism 10 is incorporated in a transfer switch power panel assembly 14. The transfer switch power panel assembly 14, including the transfer switch mechanism 10, is housed in a cabinet enclosure 16. The cabinet enclosure 16 has a rear wall 18 for mounting to a vertical mounting structure (not shown) which also supports sets of terminals (not shown) which are coupleable to a power-consuming load, a normal power supply, and an auxiliary power supply.

The transfer switch power panel assembly 14 is accessible in the cabinet enclosure 16 through a hinged cabinet door 20. The typical transfer switch power panel assembly 14 includes an upper and lower molded-case switch and/or molded-case circuit breaker 22 and 24. Both switches and/or circuit breakers 22 and 24 have OPEN and CLOSED positions corresponding to open (break) and closed (make) circuits respectively. The upper switch or circuit breaker 22 is connected into an electrical circuit that includes the power-consuming load and normal power supply. The lower switch or circuit breaker 24 is connected into a circuit that includes the power-consuming load and auxiliary power supply (neither being shown). The basic function of the transfer switch power panel assembly 14 is to transfer the power-consuming load from a circuit with the normal power supply to a circuit with the auxiliary power supply, and returning to the normal power supply when available.

Figure 5:
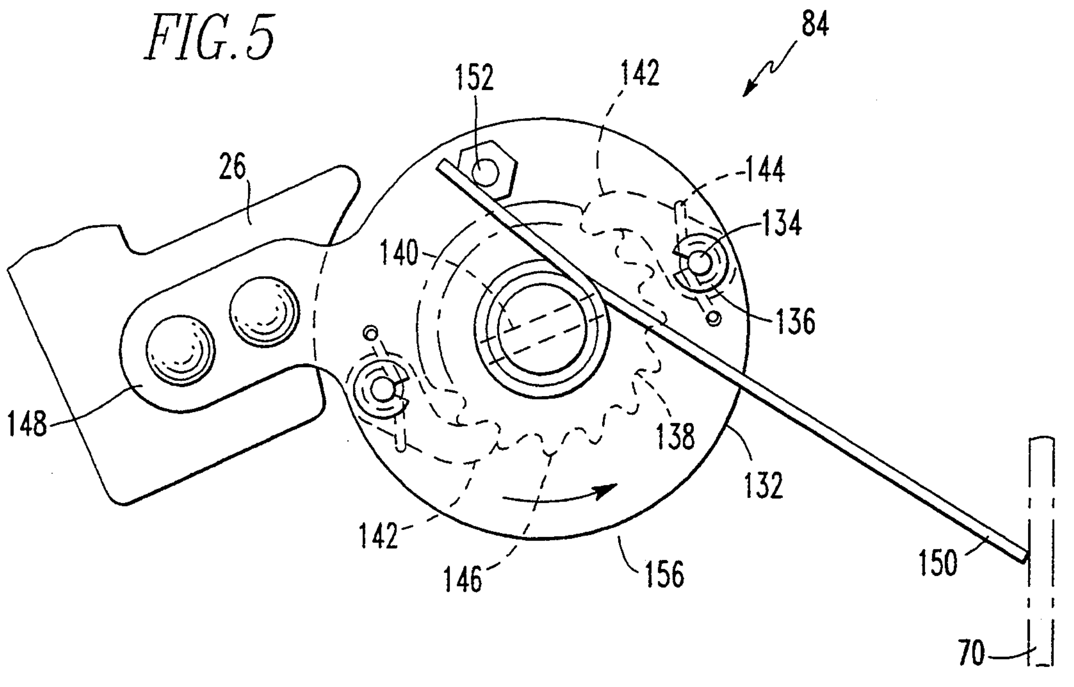
FIG. 5 is a view similar to FIG. 4 except that the lever arm is rotated a fraction of a turn counterclockwise.

The transfer switch mechanism 10 according to the invention is motor or manually operable, and for that purpose it includes a manipulable lever arm 26. The lever arm 26 has a set stroke between a retracted position (as shown in FIG. 1) and an advanced position (about an ⅛th of a turn counterclockwise from the retracted position, as shown in FIG. 5). A cover 28 nests inside the cover plate 12 and mates with the L-shaped bracket 70, which together protect internal parts (to be described).

Figure 2:
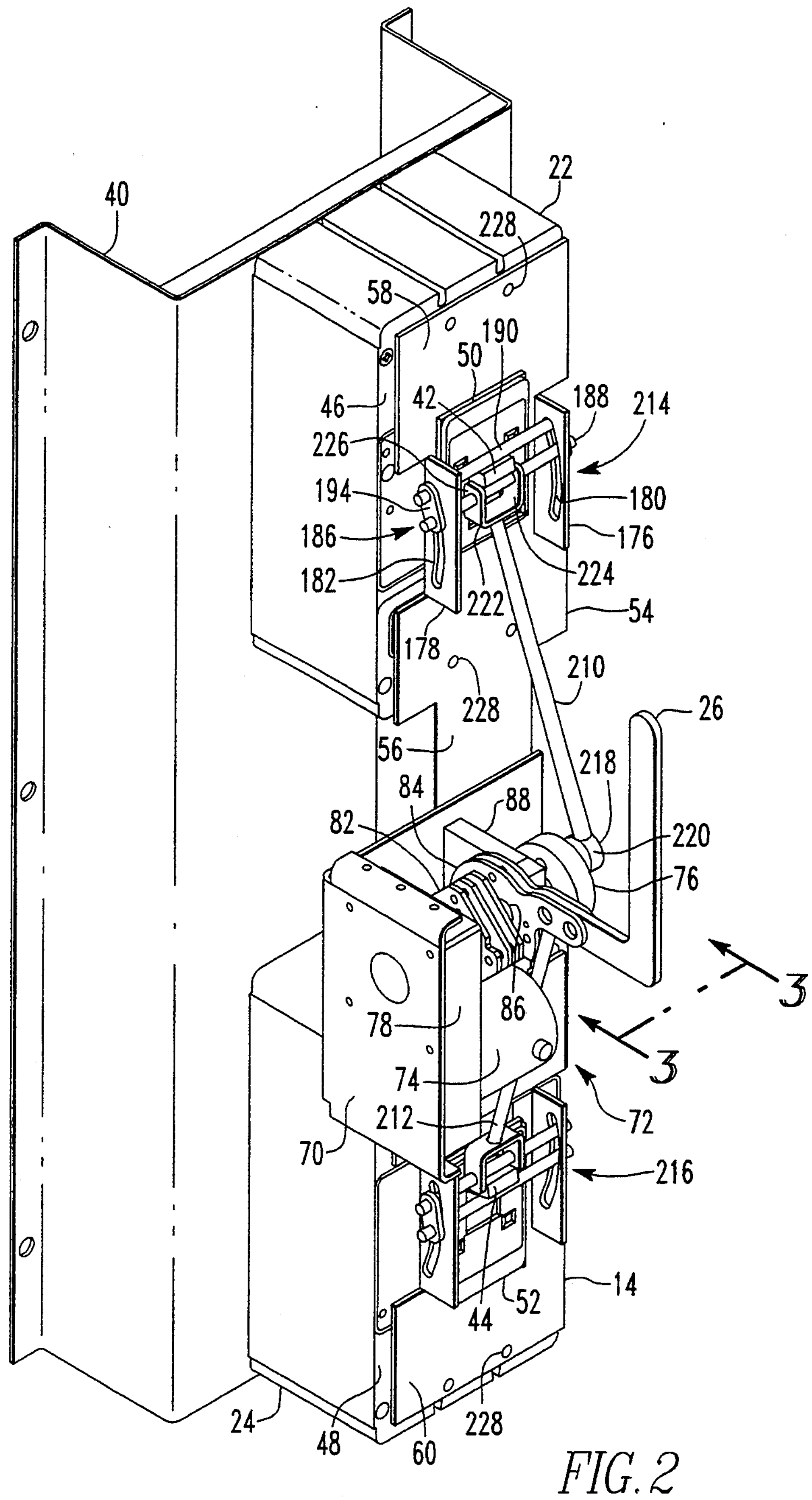
FIG. 2 is an enlarged perspective view of the transfer switch power panel assembly of FIG. 1, except that the assembly is oriented horizontally and shown from the left side (left as viewed in FIG. 1)

In FIG. 2, the transfer switch power panel assembly 14 is shown demounted from the cabinet enclosure 16, oriented horizontally, and in perspective from a point of view in the upper left corner in FIG. 1. The pair of switch or circuit breakers 22 and 24 are mounted on a inverted-U shaped platform 40. The switch or circuit breakers 22 and 24 are mounted "reverse" to each other. The left (as viewed in FIG. 2) switch or circuit breaker 22 is associated with the normal power supply while the right (as viewed in FIG. 2) switch or circuit breaker 24 is associated with the auxiliary power supply.

The switch or circuit breakers 22 and 24 have handles 42 and 44. The handles are operative between distal and proximal extremes relative to a central plane defined by the arrows 3—3. When either handle 42 or 44 is inclined away from the central plane 3—3 (corresponding to the distal extreme positions thereof), the respective circuit breaker 22 or 24 is closed (circuits made). When either handle 42 or 44 are inclined towards the central plane 3—3 (corresponding to the proximal positions thereof), the switch or circuit breaker 22 or 24 is open (circuits broken). As shown in FIG. 2, the left switch or circuit breaker 22 (which is associated with the normal power supply) is CLOSED while the fight switch or circuit breaker 24 (associated with the auxiliary power supply) is OPEN. As will be described, there never is a time when both switch or circuit breakers 22 and 24 are simultaneously closed.

The switch or circuit breakers 22 and 24 have generally planar surfaces 46 and 48 from which extend central bosses 50 and 52. The handles 42 and 44 project from the bosses 50 and 52. -The transfer switch mechanism 10 includes a planar base plate 54 extending between the switches or circuit breakers 22 and 24 and lying across the planar surfaces 46 and 48. The planar base plate 54 has a central segment 56 between opposite H-shaped portions 58 and 60 (which may be part of a channel section). The central segment 56 supports an L-shaped bracket 70. The L-shaped bracket 70 provides support for a drive system 72, which can be powered by alternative means. There is an electric motor 74 as well as the manually-operated lever arm 26. Both the electric motor 74 and lever arm 26 operatively power a drive crank 76 as follows.

The electric motor 74 has a rotor (not shown) extending into a gear train 78. The electric motor 74 is operative in one direction only, generally at one speed. The gear train 78 turns a spindle 80 (see FIG. 1) in response to operation of the electric motor 74, at a speed reduced by a factor of several times. The spindle 80 (FIG. 1) is directly coupled to a first ratchet assembly 82 of a set of first and second ratchet assemblies 82 and 84. The first ratchet assembly 82 is associated with the electric motor 74, while the second ratchet assembly 84 is associated with the lever arm 26. The ratchet assemblies are more fully disclosed in U.S. Pat. No. 5,274,206 mentioned above and incorporated herein, entitled "SPRING CHARGING MECHANISM FOR CIRCUIT BREAKERS AND TRANSFER SWITCHES".

Figure 3:
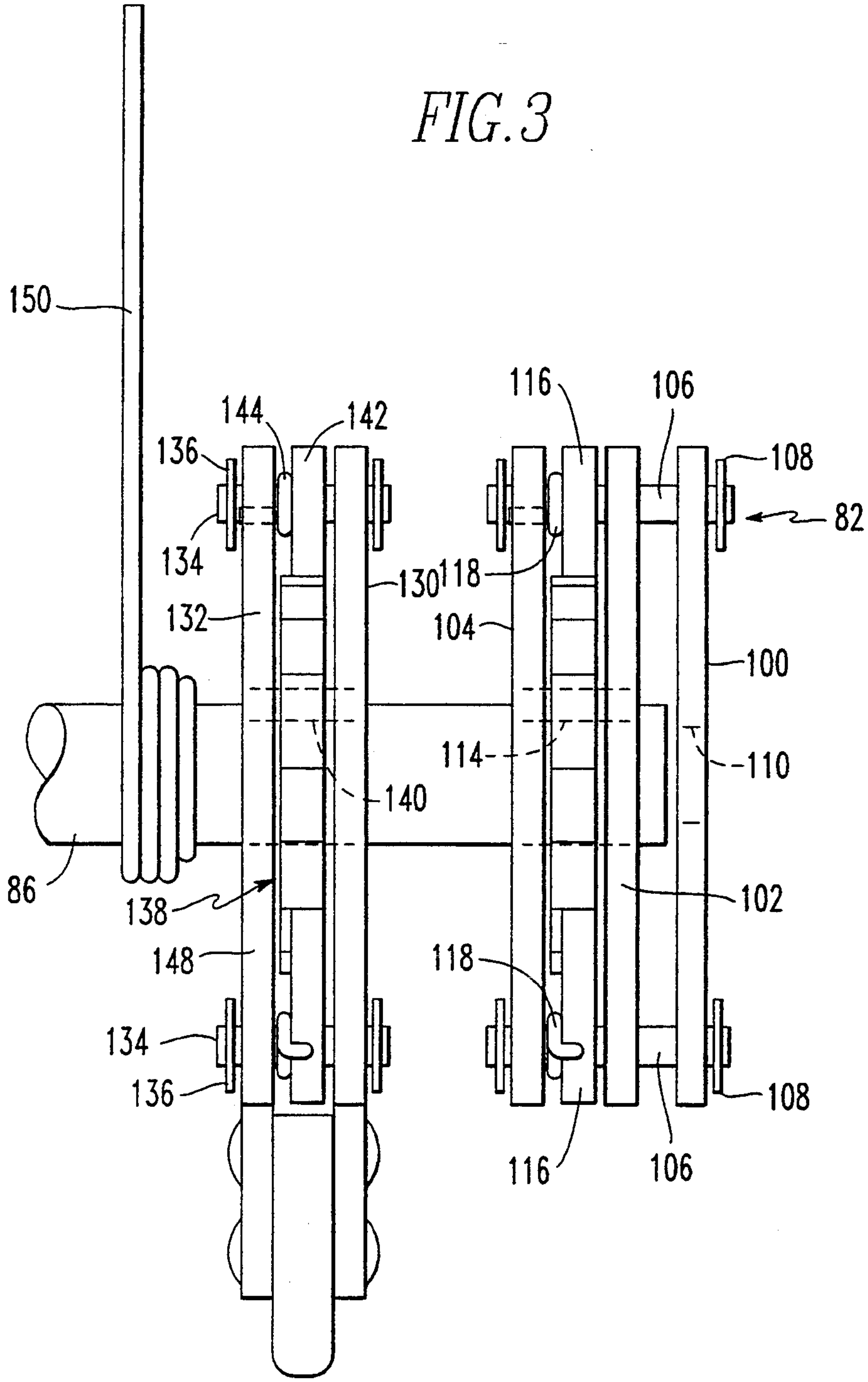
FIG. 3 is an enlarged fragmentary view taken in the direction of arrows 3—3 in FIG. 2, with portions shown in section and others in broken lines.

With reference to FIG. 3, the ratchet assemblies 82 and 84 are disposed on a drive axle 86. The drive axle 86 is rotatably supported by bearings (not shown) mounted in a pillow block 88 (see FIG. 2), which is mounted to the L-shaped bracket 70 (FIG. 2). The ratchet assembly 82 (associated with the motor 74) includes a link plate 100 disposed in spaced parallel relationships with a pair of support plates 102 and 104. All three plates 100, 102 and 104 are pinned together to rotate in unison by a set of pins 106 retained in position by retaining clips 108.

The link plate 100 has a centrally disposed rectangular aperture 110 for removably accepting a cooperatively-sized rectangular extension (not shown) from the spindle 80 (FIG. 1 ) of the gear train 78. The support plates 102 and 104 define a space between themselves which is occupied by a ratchet wheel 112. The ratchet wheel 112 is installed on the drive axle 86 to turn in unison with the drive axle 86 by means of a key 114 or other retaining means. The support plates 102 and 104, even though mounted to rotate about the drive axle 86, can rotate independently of the drive axle 86. Each of the pins 106 pivotally supports a pawl 116 that is biased to abut against the ratchet wheel 112 by a clothespin spring 118.

Figure 4:
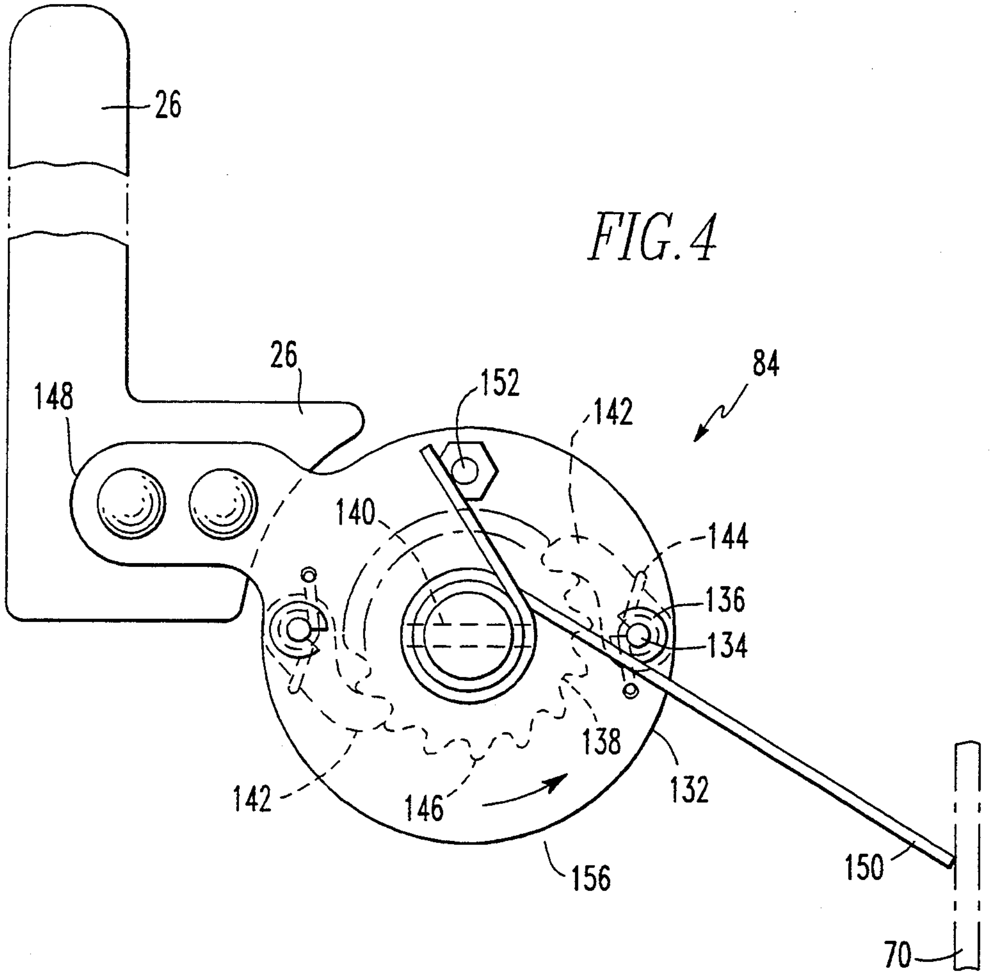
FIG. 4 is a view taken in the direction of arrows 4—4 in FIG. 3 and inverted relative thereto.

With reference to FIGS. 3, 4 and 5, the ratchet assembly 84 that is associated with the lever arm 26 comprises a pair of lever-engaging plates 130 and 132 that are disposed in a spaced parallel relationship with each other. The lever-engaging plates 130 and 132 are pinned together to rotate in unison by a set of pins 134 which are retained in position by retaining clips 136. The lever-engaging plates 130 and 132 define a space between themselves which is occupied by a ratchet wheel 138. The ratchet wheel 138 is installed on the drive axle 86 to rotate in unison with the drive axle 86 by means of a key 140 or other retaining means. The lever-engaging plates 130 and 132, on the other hand, can rotate about the drive axle 86 independently of the drive axle 86. Each of the pins 134 pivotally supports a pawl 142 that is biased to abut against the ratchet wheel 138 by a clothespin spring 144. The ratchet wheel 138 has an outer circumference formed with a plurality of teeth 146 (FIGS. 4 and 5).

The lever-engaging plates 130 and 132 have lug portions 148 extending outwards from the circular periphery thereof. The lug portions 148 cooperatively secure the lever arm 26 in a fixed relationship. In FIG. 4, the lever arm 26 is shown in the retracted position, while in FIG. 5 the lever arm 26 is shown in the advanced position. A rat-trap spring 150 maintains the lever arm 26 normally biased to return in the clockwise direction to abut against the cover 28 cover shown in FIG. 1, abutting engagement not shown), or any other suitable stop which would define retracted position for the lever arm 26.

The rat-trap spring 150 has a central opening with the drive axle 86 removably passed therethrough, and has opposite end portions resiliently biased against keeper 152 and the L-shaped bracket 70 (see FIG. 2). The keeper 152 is secured to the lever-engaging plates 130 and 132.

Figure 6:
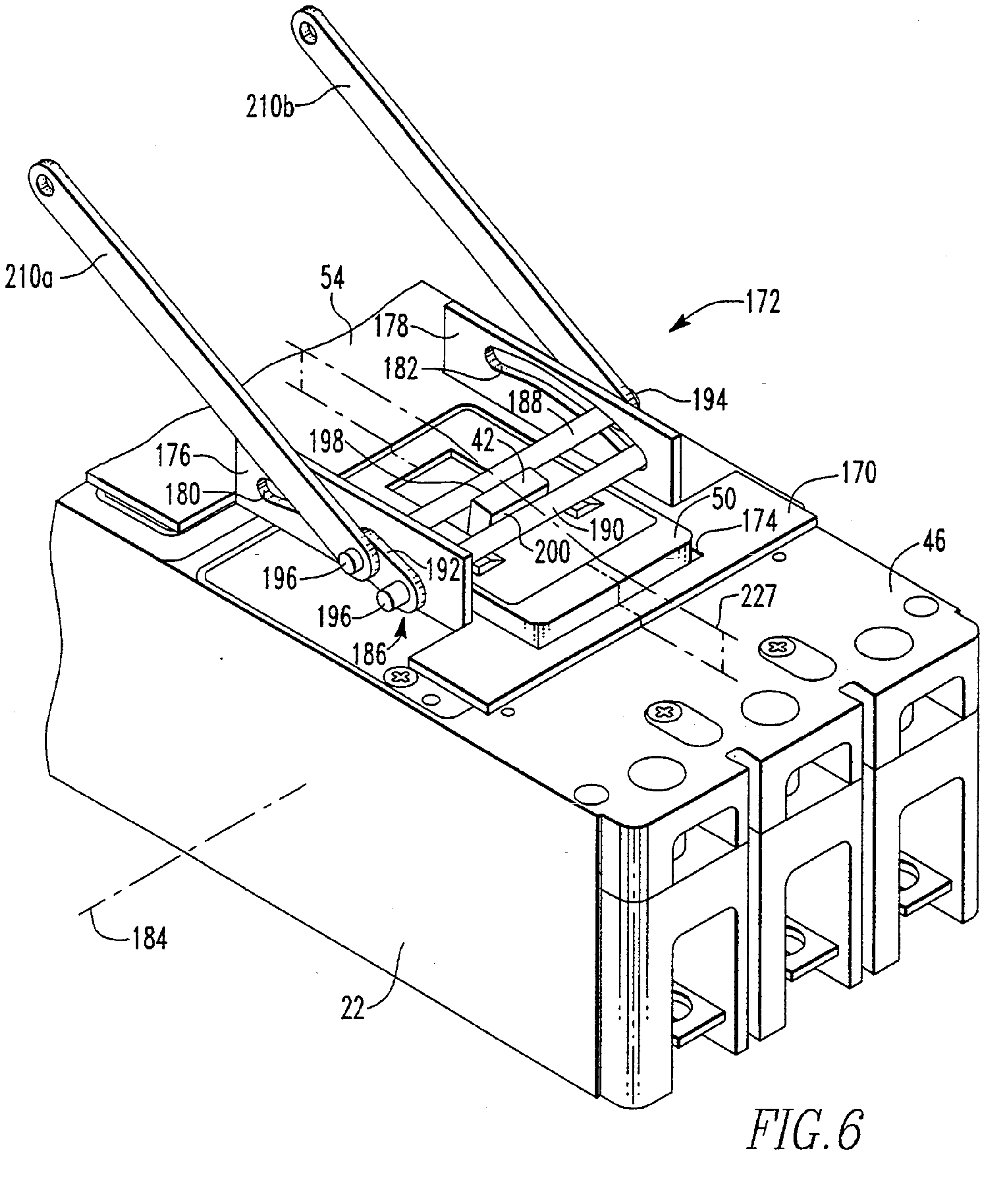
FIG. 6 is an enlarged perspective view of the transfer switch mechanism (partly broken away) and left switch or circuit breaker of FIG. 2 from a point of view in the upper left corner of FIG. 2, wherein an alternative embodiment for a connecting rod is shown.

With reference to FIG. 6, the switch or circuit breaker 22 supports an alternative embodiment 170 of the left H-shaped portion or channel 58 of the base plate 54. The H-shaped portion or channel 170 of FIG. 6 is a component of a handle actuator 172 according to the invention. The handle actuator is more fully disclosed in the copending patent application Ser. No. 08/127,919 mentioned above and incorporated herein, entitled "HANDLE ACTUATOR FOR A CIRCUIT INTERRUPTER HANDLE", filed on even date herewith.

The H-shaped portion or channel 170 of FIG. 6 has a central rectangular opening 174. The rectangular opening 174 is sized for removably passing over the boss 50 of the switch or circuit breaker 22. The H-shaped portion or channel 170 supports an opposed pair of standing flanges 176 and 178 on opposite sides of the rectangular opening 174. The flanges 176 and 178, for example can be integral with the base plate 54 and bent up from the plane of the base plate 54. The flanges 176 and 178 are provided with arcuate openings 180 and 182. The handle 42 of the switch or circuit breaker 22 is characteristically pivotal about a pivot axis shown by center line 184. The arcuate openings 180 and 182 are concentric with the pivot axis 184 of the handle 42.

The handle actuator 172 includes a head 186 which comprises a pair of elongate pins 188 and 190 and a pair of retainers 192 and 194 rigidly spacing the pins 188 and 190 in a parallel relationship. The pins 188 and 190 have opposite end portions (the left end portions 196 being shown in FIG. 5) extending through the arcuate openings 180 and 182 of the flanges 176 and 178. The retainers 192 and 194 are positioned with the flanges 176 and 178 disposed between the retainers 192 and 194. Alternatively, the retainers 192 and 194 may placed between the flanges 176 and 178. The spacing between the pins 188 and 190 is sized for closely fitting and straddling or flanking the handle 42 to eliminate lost motion as well as the potential for impact between the handle 42 and the pins 188 and 190.

The handle 42 has proximal and distal surface portions 198 and 200 respectively adjacent the pins 188 and 190. The pins 188 and 190 form a handle-engaging means that fits next to the handle 42 closely and is mounted and guided such that the relative position of the handle 42 and pins 188 and 190 does not vary as the handle 42 is moved. The surface portions 198 and 200 are generally planar. The pins 188 and 190 can have outer cylindrical-surface portions defining abutment surfaces that are abutting against the handle surfaces 198 and 200, respectively, or alternatively the pins can have flat surfaces resting against the handle. Whereas the arcuate openings 180 and 182 allow the pins 188 and 190 to follow the arcuate motion of the handle 42 at the area of engagement, there is no relative displacement between the handle 42 and the pins 188 and 190 and no need for the pins 188 and 190 to roll. The pins 188 and 190 preferably define a line of contact on both sides of the handle 42 on the surfaces 198 and 200.

Returning to FIG. 2, the transfer switch mechanism 10 according to the invention includes a pair of connecting rods 210 and 212. The left connecting rod 210 extends between the crank 76 and an alternative embodiment 214 of the handle actuator 172 of FIG. 6. The handle actuator 214 of FIG. 2 is identical to a handle actuator 216 mounted above the right circuit switch or breaker 24, and both handle actuators 214 and 216 are generally similar to the handle actuator 172 of FIG. 6.

The crank 76 rotates about an axis coincident with the rotation axis of the drive axle 86. The crank 76 supports a pivot pin 218 at a position radially spaced away from these coincident rotation axes such that the pin 218 orbits in a circular path.

The pair of connecting rods 210 and 212 cooperatively couple the crank 76 with the handle actuators 214 and 216 respectively. The left connecting rod 210, which is typical of the right connecting rod 212, has a loop or ball joint rod end 220 pivotally connected to the pivot pin 218. The other end opposite to the ball joint rod end 220 is mated to a U-shaped yoke 222. A U-shaped yoke 222 has opposite arms 224 and 226 terminating in spaced end portions which are pivotally coupled to the proximal pin 188 on opposite sides of the handle 42, thereby permitting the handle-engaging structure or head 186 (including pins 188 and 190 and retainers 192 and 194) to pivot as needed to follow the arc of the openings 180 and 182.

FIG. 6 shows and alternative embodiment for the connecting rod 210 of FIG. 1. The handle actuator 172 of FIG. 6 is operated by a pair of connecting links **210*a* and 210*b*. The connecting links 210*a* and 210*b* have proximal ends coupled to the proximal pin 188 and distal ends coupled to a drive input (not shown in FIG. 6). Connecting links 210*a* and 210*b* can be operated in the manner shown by FIG. 2, wherein the proximal ends of the links 210*a* and 210*b* are driven in circular paths. The connecting links 210*a* and 210*b* are disposed symmetrically about a plane of symmetry 227 through the handle 42, the plane of symmetry 227 intersecting the pivot axis 184 at fight angles to eliminate twist between the handle 42 and head 186**.

Both embodiments 172, 214 of the handle actuator have planar H-shaped portions 170,58 for clapping together with the generally planar surface 46 of switch or circuit breaker 22. The H-shaped portions 170,58 and planar surface 46 are releasably fastened together by a plurality of fasteners 228 that extend through holes in the switches or circuit breakers to attach to the inverted-U shaped platform 40. Switch or circuit breaker 22 is representative of a wide array of commercially available molded-case switches or molded-case circuit breakers having pivotal handles. Consequently, the handle actuators 172, 214 according to the invention can be usably scaled to any remote sizes of switch or circuit breakers.

With general reference to FIGS. **7*a*, 7*b* and 7*c*, the transfer switch mechanism 10 is operable to advance or retract the handle actuators 214 and 216 through progressive positions ranging between proximal and distal extremes. Applications for a transfer switch mechanism according to the invention include, among other applications, (i) transfer switches and (ii) manually-operated devices for gaining a mechanical advantage over the operation of the handles of large circuit interrupters, as the handles of large circuit interrupters can require 150 to 300 pounds or more to operate. The transfer switch mechanism 10** can cost relatively little to make and is easy to manufacture, yet it is strong and durable even for use with large circuit interrupters.

In FIG. 7*a*, the typical transfer switch mechanism 10 is shown with the crank pin 218 positioned at a 12 o'-clock position. The upper handle actuator 214 is shown at the extreme distal position while the lower handle actuator 216 is shown at the extreme proximal position. Correspondingly, the upper switch or circuit breaker 214 associated with the normal power supply is closed (circuit is made) while the lower switch or circuit breaker 216 associated with the auxiliary power supply is open (circuit is broken). Accordingly, the power-consuming load is connected in a circuit with the normal power supply, and not the auxiliary power supply.

In FIG. 7*b*, the transfer switch mechanism 10 has been operated until the crank pin 218 has rotated counterclockwise from the 12 o'clock position of FIG. 7*a* to a 9 o'clock position. To do that, the lever arm 26 is repeatedly pumped between the advanced and retracted positions to cause an interaction among the components of the transfer switch mechanism 10 to be described. In consequence, the handles 42 and 44 of both switches or circuit breakers 22 and 24 are displaced to a top-dead center position (as shown by FIG. 7*b*), wherein both circuit switches or breakers 22 and 24 are open (i.e., the power-consuming load is isolated from both the normal power supply and auxiliary power supply).

In the art of transfer switches, this transfer switch power panel assembly 14 provides what is called "open transition." That is, the power-consuming load can be isolated from the two power supplies during the period from (i) after the circuit with the normal power supply is broken until (ii) before the circuit with the auxiliary power supply is made, or vice versa. Ordinarily, one advantage that open transition provides is time for the auxiliary power supply to come-up to speed before transferring the power-consuming load into a circuit therewith.

The transfer switch mechanism 10 according to the invention does include the first ratchet assembly 82 (otherwise associated with the electric motor 74). But, insofar as manual-operability is concerned, the support plates 102 and 104 are fixed stationary for all purposes. A purely manual version of the transfer switch mechanism 10 according to the invention would replace the electric motor 74 and gear train 78 with a manual supporting bracket (not shown). Yet such manual version would still need as much of the first ratchet assembly 82 that includes fixed support plates 102,104 pivotally supporting pawls 116 and ratchet wheel 112 keyed or suitably fastened to drive axle 86.

In the embodiment 10 of the transfer switch mechanism, an electric motor 74 is provided. In practical terms, the support plates 102 and 104 cannot be turned without operation of the electric motor 74. The gear train 78 reduces the speed of the motor 74 by such a substantial factor that the spindle 80 (FIG. 1) cannot practically be turned to drive the motor 74. To turn the motor 74 via the spindle 80 (FIG. 1) evidently requires such a large torque that experience shows such torque is virtually never developed during manual operation of the transfer .switch mechanism 10.

Thus, the transfer switch mechanism 10 operates in the following manner. FIG. 7*a* shows the lever arm 26 in the retracted position. The power stroke for the lever arm 26 is in the counterclockwise direction, toward the advanced position (see FIG. 5). Rotation of the lever arm 26 in either direction directly drives the lever-engaging plates 130 and 132 in the respectively same direction. The pawls 142 between the lever-engaging plates 130 and 132 will drive against the teeth 146 of the ratchet wheel 138 as the plates 130 and 132 turn in the counterclockwise direction, but will glide across the teeth 146 in ratchet fashion as the plates 130 and 132 turn in the clockwise direction.

The ratchet wheel 138 turns in fixed unison with the drive axle 86 and other ratchet wheel 112 (which is associated with the first ratchet assembly 82). As the ratchet wheel 112 of the first ratchet assembly 82 turns in the counterclockwise direction, the pawls 116 between the stationary support plates 102 and 104 glide in ratchet fashion across the teeth of ratchet wheel 112. But if the ratchet wheel 112 is torqued in the clockwise direction, the pawls 116 between the stationary plates 102 and 104 drive against the teeth of the ratchet wheel 112, thereby precluding clockwise rotation of the ratchet wheel 112. Clockwise rotation Of the drive axle 86 and other ratchet wheel 138 are likewise precluded because they are fixed to turn in unison with the first ratchet wheel 112.

So, counterclockwise rotation of the lever arm 26 turns the drive axle 86 in the counterclockwise direction too, while the drive axle 86 remains stationary as the lever arm 76 pivots in the clockwise direction toward its retracted position.

Several back and forth strokes of the lever arm 26 will eventually cause the crank pin 218 to orbit in a circular path from the 12 o'clock position of FIG. 7*a* to the 9 o'clock position of FIG. 7*b*. The ball joint rod end 220 of the upper connecting rod 210 orbits in the counterclockwise direction in unison with the crank pin 218. The upper U-shaped yoke 222 is thus pulled downwardly (as viewed in FIG. 7*a*). The upper U-shaped yoke 222 is coupled to the distal handle-engaging pin 190 via interconnecting links which include the proximal handle-engaging pin 188 and opposite retainers 192 and 194. As the upper U-shaped yoke 222 moves downwardly, the distal handle-engaging pin 190 is driven against the distal surface 200 of the handle 42.

In FIG. 7*a*, the distal pin 190 is preliminarily disposed in the extreme distal position. The distal pin 190 operates the handle 42 by bearing against the handle surface 200 to urge the handle 42 to move from the closed position toward the top-dead center position.

The base 54 and flanges 176 and 178 form a mounting means movably supporting the head 186 on the base 54, the mounting means maintaining a substantially constant relative position of the abutment surfaces 188 and 190 on the handle surfaces 198 and 200 as the handle 42 is driven from the extreme distal position to the top-dead center position. Arcuate openings 180 and 182 define arcuate paths for the pins 188 and 190. The arcuate paths are coaxial with the pivot axis 184 defined by the pivotal handle 42. Consequently, the relative position of the distal pin 190 and distal surface 200 on the handle 42 remain substantially constant while the handle 42 is driven. The constant relative position is such that the pin 190 neither slides nor rolls across the handle surface 200, thereby eliminating the problem of handle erosion. The line of action (which is defined as the force transmitted by the pin 190 to the surface 200) is generally coincident with a tangent of an arc about an axis coincident with the pivot axis 184.

As the upper handle actuator 214 moves from the extreme distal position progressively toward the top-dead center position, the lower handle actuator 216 is simultaneously driven from its extreme proximal position progressively toward the top-dead center position. The lower handle actuator 216 would progressively drive the handle 44 from open position (FIG. 7*a*) to the closed position (FIG. 7*c*). The operation of the lower handle actuator 216 is generally the reverse of the operation of the handle actuator 214. Preferably, the upper switch or circuit breaker 22 opens (breaks) before the lower switch or circuit breaker 24 closes (makes), thereby operating in accordance with the "open transition" style.

The handle actuators 172 (FIG. 6) and 214 (FIG. 2) and 216 are coupled to the crank 76 in a manner that precludes twisting between the handle 42 and head 186 (i.e., pins 188 and 190). To this end, the connecting rod 210 generally moves in the plane of symmetry 227 through the handle 42, wherein this plane of symmetry 227 intersects the pivot axis 184 at fight angles. The connecting rod 210 is arranged as a crank arm. However, for the most part the connecting rod 210 reciprocates, because the circular path of the ball joint rod end 220 defines a small diameter relative to the length of the connecting rod 210. The connecting rod 210 thus moves generally linearly along a tangent of an arc about an axis coincident with the pivot axis 184. Those attributes of the connecting rod 210 are generally present in the connecting links 210*a* and 210*b*. For example, the connecting links 210*a* and 210*b* are disposed symmetrically about the plane of symmetry 227 through the handle 42 for avoiding twist between the handle 42 and head 186.

An electrician (or other operator) has to pump the lever arm 26 back and forth three to four times to turn the crank 76 180 degrees. Turning the crank 76 180 degrees will transfer the power-consuming load from a circuit with the normal power supply (e.g., FIG. 7*a*) to a circuit with the auxiliary power supply (e.g., FIG. 7*c*), and vice versa. The electrician may desire to stay at the open transition position (e.g., FIG. 7*b*) for an indefinite period of time. The electrician can determine the open transition position by more than one means.

With reference to FIG. 1, the crank 76 has an outer perimeter 230 that carries a position indicator. The position indicator on the outer perimeter 230 provides a visual means for the electrician to determine whether the transfer switch power panel assembly 14 is positioned in the open transition position (FIG. 7*b*), or either the auxiliary or normal power positions. The position indicator on the outer perimeter 230 of the crank 76 is viewable through an opening or window in the cover 28. The outer perimeter 230 is divided into four sections, and each section carries indicia. In consecutive order, these indicia are "NORMAL", "NEUTRAL", "EMERGENCY", and "NEUTRAL" again, corresponding to the normal power position, open transition, auxiliary power position, and open transition again respectively.

Additionally, the electrician can feel the open transition by differences in the operating resistance of the lever arm 26. As the crank 76 turns 180 degrees from the position shown in FIG. 7*a* to that in FIG. 7*c*, the electrician feels, in succession: (i) relatively heavy resistance steeply increasing to very heavy resistance until the upper switch or circuit breaker 22 finally breaks contact (opens), (ii) relatively light resistance gradually increasing to the heaviest resistance of all until the lower switch or circuit breaker 24 finally makes contact (closes), and (iii) relatively light resistance as the handle actuators 214 and 216 nearly dwell at the proximal or distal extremes therefor. The open transition corresponds to the positions which the electrician feels in zone (ii).

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. Apparatus for transferring a power-consuming load reversibly between a pair of electric circuits, the apparatus comprising:

a pair of switch devices respectively associated with the pair of electric circuits;

each switch device having a handle movable between extreme positions, and the switch devices being disposed such that the handle of each switch device moves reversibly towards and away from the other switch device;

a pair of heads, each head respectively associated with one of said switch devices and each head having opposed abutment surfaces removably receiving the handle of the associated switch device between the abutment surfaces;

a drive input including a grip operable in a cyclical stroke, the grip having a gripping portion permitting a handhold for manual operation thereof along the stroke;

supporting means, extending between and fixed relative to the switch devices, movably supporting the heads and grip, drivable means, driven by the drive input, coupled to the heads for driving the abutment surfaces against the handles to move the handles in response to the stroke of the grip; and, unidirectional means, associated with the drivable means, permitting the handles to advance and return progressively between the extreme positions and for opposing movement of the drivable means in the direction opposite to the progressive advance of the drivable means at handle positions intermediate the extreme positions.

2. The apparatus of claim 1, wherein:

the switch devices are operative such that operating the grip opens one switch device before closing the other switch device to ensure that the power-consuming load is isolated from the electric circuit associated with said one switch device before transfer to the electric circuit associated with said other switch device.

3. The apparatus of claim 1, wherein:

the grip comprises a pivoted lever arm that is operable pivotally between advanced and retracted positions.

4. The apparatus of claim 1, wherein:

the unidirectional means comprises a ratchet and pawl assembly permitting rotation of the drivable means in one direction and opposing rotation in the direction counter to said one direction.

5. The apparatus of claim 1, wherein:

each head includes a pair of elongated pins disposed in a rigidly spaced parallel relationship;

the pins have outer surface portions between opposite ends;

the abutment surfaces are defined by outer surface portions of the elongated pins;

the supporting means includes two pair of spaced flanges, each pair being respectively associated with one of the pair of switch devices, the flanges of each pair being disposed on opposite sides of the handle of the associated switch device; and, each flange has an arcuate opening slidably receiving one of the opposite ends of the pins to define such a path for the head that the abutment surfaces are maintained at a substantially constant relative position on the handles as the handles are moved between the extreme positions.

6. The apparatus of claim 1, wherein:

the drivable means includes a crank turning about a rotation axis in response to the stroke of the grip and two links, each link having a proximal and distal end; and, the proximal ends are driven in a circular path by the crank and each distal end is respectively coupled to one of the heads.

7. The apparatus of claim 1, wherein:

the pair of switch devices are one of a pair of molded-case switches and a pair of molded-case circuit breakers.

8. The apparatus of claim 1, wherein:

the drive input includes an electric motor for driving the drivable means.

9. A manually-operable device coupled to a pair of circuit components; each circuit component having a handle, protruding from a generally planar surface, movable between operative positions; the device comprising:

a pair of heads;

each head respectively associated with one of said circuit components and each head having opposed abutment surfaces removably receiving the handle of the associated circuit component between the abutment surfaces;

a grip operable in a cyclical stroke, having a gripping portion to permit a handhold for manual operation thereof;

drivable means, driven by the grip, coupled to the heads for driving the abutment surfaces against the handles to move the handles between the operative positions in response to the stroke of the grip; and, a base, clapped together with the generally planar surfaces of the circuit components in a releasably fixed relationship, movably supporting the grip and movably supporting the heads such that the heads maintain a substantially constant relative position on the handles as the handles are driven between the operative positions.

10. The device of claim 9, wherein:

the grip comprises a pivoted lever arm that is operable pivotally between advanced and retracted positions.

11. The device of claim 9, wherein:

each head includes a pair of elongated pins disposed in a rigidly spaced parallel relationship;

the pins have outer surface portions-between opposite ends;

the abutment surfaces are defined by outer surface portions of the elongated pins;

the base includes two pair of spaced flanges, each pair being respectively associated with one of the pair of circuit components, the flanges of each pair being disposed on opposite sides of the handle of the associated circuit component; and, each flange has an arcuate opening slidably receiving one of the opposite ends of the pins to define such a path for the head that the abutment surfaces are maintained at the substantially constant relative positions on the handles as the handles are driven between the operative positions.

12. The device of claim 9, wherein:

the drivable means includes a crank and a ratchet and pawl assembly permitting the crank to turn in one direction and opposing turning of the crank in the direction counter to said one direction.

13. The device of claim 9, wherein:

the base is attachable to a pair of circuit components comprising one of a pair of circuit interrupters, a pair of molded-case circuit breakers, a pair of molded-case switches, and a pair of motor contactors.

14. Apparatus for transferring a power-consuming load reversibly between two electric circuits; the apparatus comprising:

two switch devices, respectively associated with the two electric circuits, disposed fixed relative to each other;

each switch device having a handle pivotal between operative positions;

a pair of heads, each head respectively associated with one of the two switch devices and each head having opposed abutment surfaces removably receiving the handle of the associated switch device between the abutment surfaces;

a grip operable in a cyclical stroke, having a gripping portion permitting a handhold for manual operation thereof;

drivable means, driven by the grip, coupled to the heads for driving the abutment surfaces against the handles to move the handles between the operative positions in response to the stroke of the grip;

supporting means, extending between and fixed relative to the switch devices, movably supporting the grip;

two pair of spaced-flange portions, each pair of spaced-flange portions respectively associated with one of the two switch devices, the spaced-flange portions being disposed on opposite sides of the handle of the associated switch device; and, each flange portion having an arcuate opening and each head being coupled to one pair of spaced-flange portions at the arcuate openings such that the abutment surfaces are guided in an arcuate path about axis that is coincident with a pivot axis defined by the pivoted handle of the associated switch device.

15. The apparatus of claim 14, wherein:

the switch devices are operative such that operating the grip opens one switch device before closing the other switch device to ensure that the power-consuming load is isolated from the electric circuit associated with said one switch device before transfer to the electric circuit associated with said other switch device.

16. The apparatus of claim 14, wherein:

the grip comprises a pivoted lever arm that is operable pivotally between advanced and retracted positions.

17. The apparatus of claim 14, wherein:

each head includes a pair of elongated pins disposed in a rigidly spaced parallel relationship;

the pins have outer surface portions between opposite ends;

the abutment surfaces are defined by outer surface portions of the elongated pins; and, the elongated pins have opposite end portions that protrude into the arcuate openings in the flanges.

18. The apparatus of claim 14, wherein:

the drivable means includes a crank turning about a rotation axis in response to the stroke of the grip and two links, each having a proximal end and distal end; and, the proximal ends are driven in circular paths by the crank and each distal end is coupled to one respective head.

19. The apparatus of claim 18, wherein:

the drivable means includes a ratchet and pawl assembly permitting the crank to turn in one direction and opposing turning of the crank in the direction counter to said one direction.

20. The apparatus of claim 14, further comprising:

the two switch devices comprise one of two molded-case circuit breakers and of two molded-case switches.

* * * * *